United States Patent [19]

Schering

[11] 4,087,891

[45] May 9, 1978

[54] TURRET TOOLPOSTER

[75] Inventor: Stig Schering, Vesteras, Sweden

[73] Assignee: SMT Machine Company AB, Vesteras, Sweden

[21] Appl. No.: 751,740

[22] Filed: Dec. 17, 1976

[30] Foreign Application Priority Data

Dec. 22, 1975 Sweden .................................. 7514528
Oct. 25, 1976 Sweden .................................. 7611832

[51] Int. Cl.² ............................ B23B 9/00; B23B 3/16
[52] U.S. Cl. ............................................. 29/36; 29/39; 29/27 C; 408/35
[58] Field of Search ............................ 29/36, 39, 27 C; 82/36 A; 408/35

[56] References Cited

U.S. PATENT DOCUMENTS

| 3,691,613 | 9/1972 | Walk ..................................... 29/27 C |
| 3,955,257 | 5/1976 | Herbst et al. ...................... 408/35 X |
| 4,006,518 | 2/1977 | Rudolph et al. .......................... 29/39 |

Primary Examiner—Gil Weidenfeld
Attorney, Agent, or Firm—Karl W. Flocks

[57] ABSTRACT

A turret toolpost preferably for numerically controlled automatic lathes includes two relatively adjustable turrets for the cutting tools, one turret being disposed outside the other turret. The axes of these two turrets make a small angle with one another.

6 Claims, 2 Drawing Figures

TURRET TOOLPOSTER

This invention relates to a turret toolpost, preferably for numerically controlled automatic lathes, comprising two relatively adjustable turrets for the cutting tools, one turret being disposed outside the other turret. Characteristic of the present invention is that the axes of the turrets make a small angle with one another. The invention thus eliminates the risk that the tools of the inner turret will collide with the workpiece.

In a preferred embodiment the inner turret is rotatably mounted on a bearing sleeve which makes the small angle with a tubular sleeve fixedly connected therewith and mounted for rotation about the main axis of the turret housing, said axis also forming the centre of rotation for the outer turret.

Figure 1:
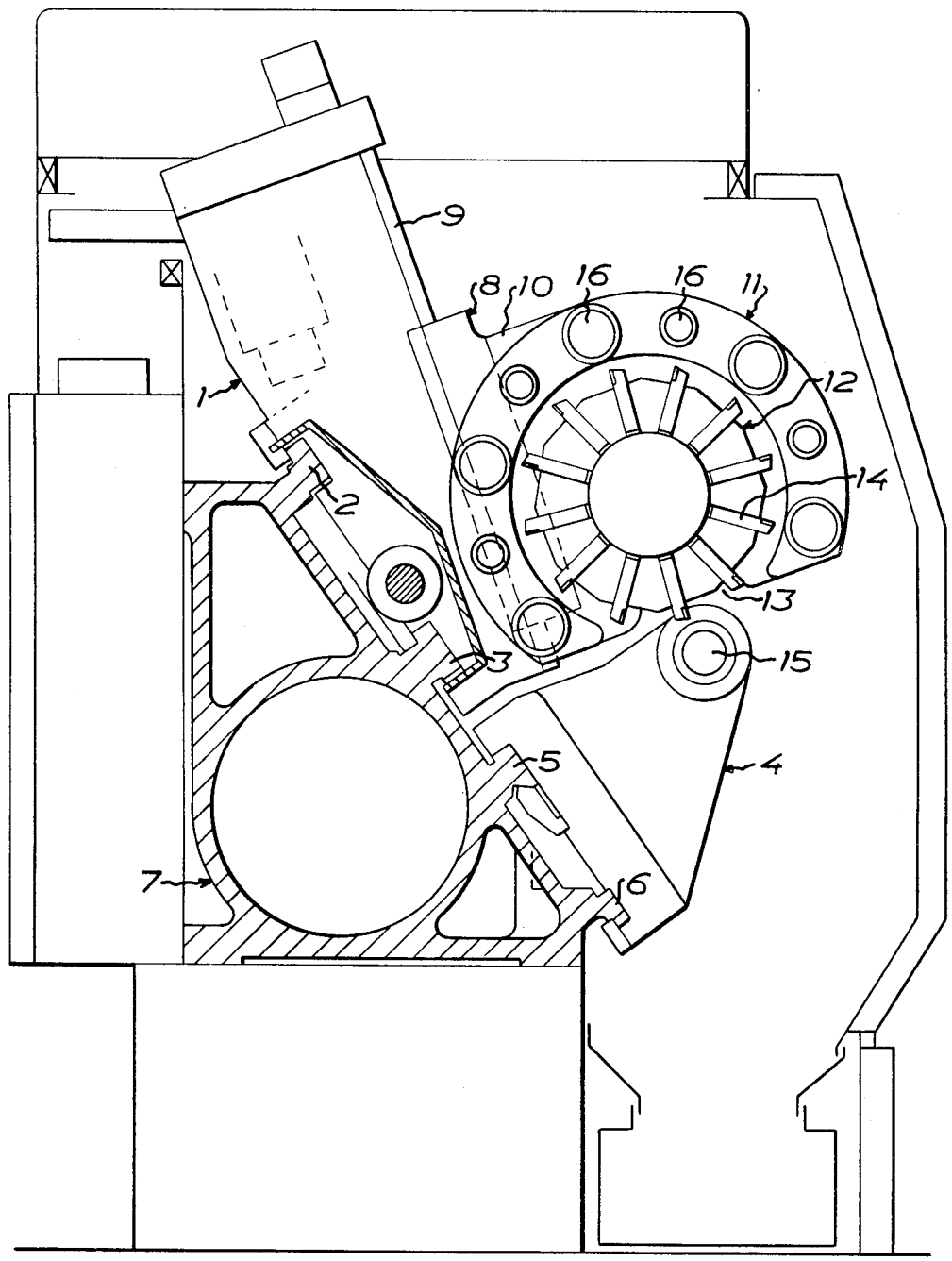
Figure 2:
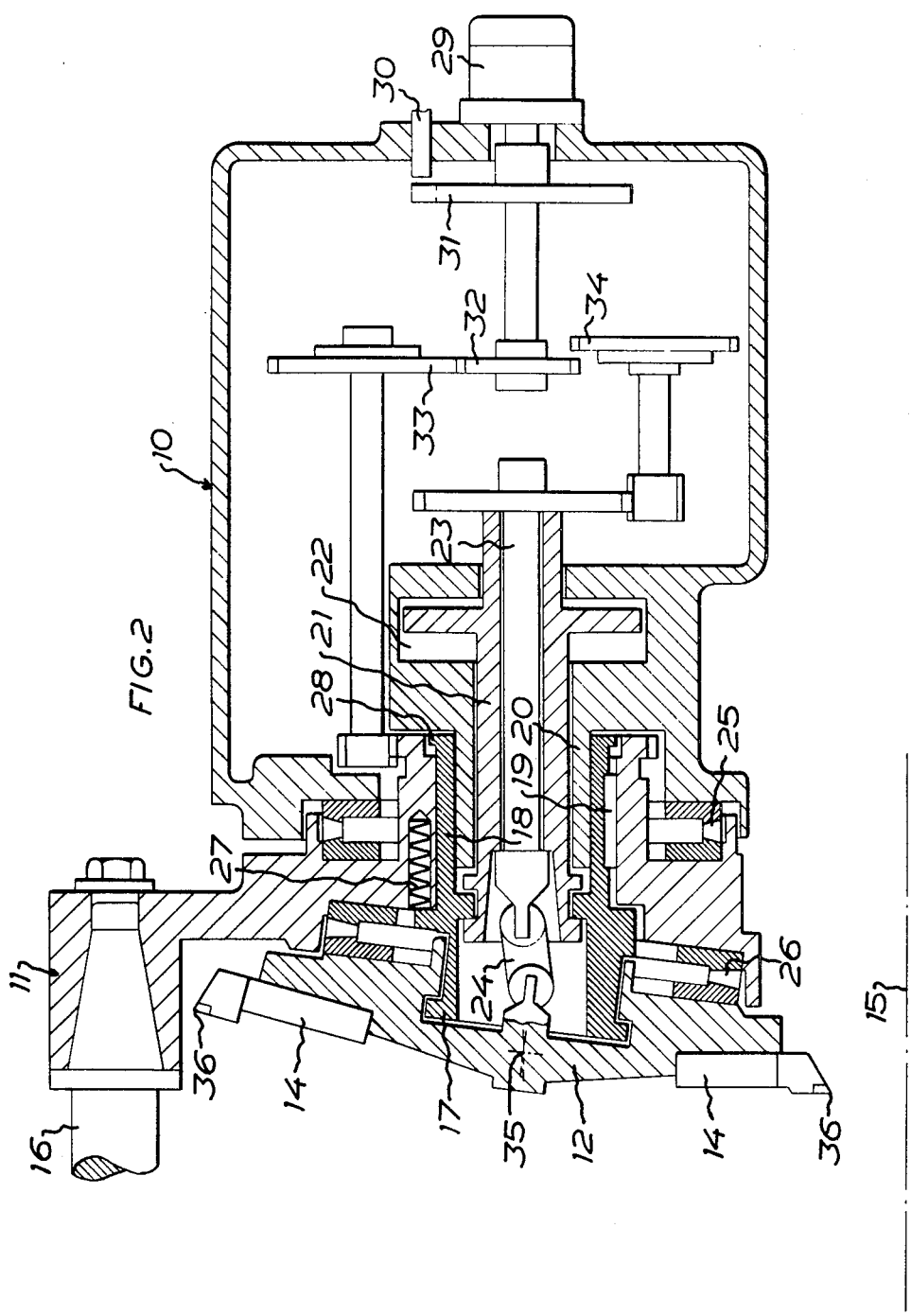

An embodiment of the invention will be more fully described hereinafter with reference to the accompanying drawings in which FIG. 1 is a front view of the turret toolpost of an automatic lathe which is shown in a cross-section of the lathe bedways as viewed from the headstock towards the lathe saddle, cross slide and tailstock;

FIG. 2 on a larger scale is a longitudinal section of the turret toolpost proper.

1 denotes the lathe saddle which is movable in a direction at right angles to the plane of the drawing and is guided along the guides 2 and 3. 4 denotes the tailstock which is likewise movable at right angles to the plane of the drawing along the guides 5 and 6. The guides 2, 3, 5 and 6 are part of the bedways 7.

The cross slide 8 is movable on the saddle 1 in the plane of the drawing along the guide 9. It has a housing 10 for the two turrets 11 and 12 which are separate units having separate indexing mechanisms and also separate transmitters for angular positions.

As will appear from the drawing, the turret 11 is disposed outside the turret 12. The outer turret 11 has a recess 13 for the tools 14 of the inner turret 12 so that said tools 14 can engage the workpiece in the automatic lathe the spindle axis 15 of which is parallel or almost parallel with the axis of rotation of the outer turret 11.

Tools 16 for internal machining, such as drills, are secured in the outer turret 11 and extend in the longitudinal direction of the spindle 15. Whenever the diameter of the workpiece so permits all tools 16 can be utilized, otherwise only the coarser tools which in the embodiment illustrated are five in number. This number may of course be varied.

The inner turret 12 has radially directed rectangular nests for the fixation of the tool shafts 14. These tools are intended for machining outer cylinder surfaces and shoulders. When the tools 14 of the inner turret 12 are utilized, the outer turret 11 shall be arrested in its angular position, which is shown in the drawing. The recess 13 shall thus be facing the workpiece, so that the inner turret 12 is exposed to the workpiece.

As already stated and as clearly appears from FIG. 2, the axes of the turrets 11 and 12 shall make a small angle with one another, preferably an angle of about 8°.

The inner turret 12 is mounted for rotation on the bearing sleeve 17 making the small angle with the tubular sleeve 18 which is integral with said sleeve 17 and mounted for rotation about the main axis of the turret housing 10, said axis also forming the centre of rotation for the outer turret 11.

The outer turret 11 is non-rotatably, but axially movably connected with the tubular sleeve 18 equipped with the bearing sleeve 17, said connection being brought about with the aid of the wedge member 19. Thus, the recess 13 will always be opposite that tool 14 which lies outermost by reason of the inclination of the turret 12. When machining is effected with a tool 14, the recess 13 of the turret 11 should of course be facing the spindle axis, as illustrated in FIG. 1.

The tubular sleeve 18 having the bearing sleeve 17 thereon is mounted on the neck 20 of the turret housing 10 through which runs the piston rod 21 of the cylinder piston unit 22. The piston rod 21 cooperates with the bearing sleeve 17 to permit moving said sleeve 17 by means of the cylinder and piston unit 22. To this end, the piston rod 21 has projections or like means which cooperate with a shoulder or like element on the bearing sleeve 17 or the sleeve 18.

As will appear from the illustrated embodiment the piston rod 21 is tubular, and through said rod 21 there extends an axis of rotation 23 for the inner turret 12 which is mounted on the bearing sleeve 17. The axis of rotation 23 includes a universal-joint shaft 24 or like member, which permits the requisite angular positioning of the inner turret 12.

In working position the two turrets 11 and 12 are fixed by means of planar toothed disks 25 and 26. More particularly, the turret 11 is fixed by means of the pair of disks 25 with regard to the housing 10, while the turret 12 is fixed by means of the pair of disks 26 with regard to the turret 11.

The two turrets 11 and 12 are pressed together and against the housing 10 by the cylinder piston unit 22. The pull is transmitted to the turret 12 via the piston rod 21 and the bearing sleeve 17.

For indexing the turrets 11 and 12 have to be moved apart to such an extent that the engagement of the two planar toothed disks 25 and 26 is released. To achieve this the axial movement of the turret 11 must be limited to half of the axial movement of the turret 12. This is accomplished by the fact that a number of springs 27 retain the turret 11 in engagement with the housing 10 during the first half of the movement of the piston. Then the abutment 28 engages the hub of the turret 11 and withdraws it from its meshing engagement with the housing 10. The two turrets 11 and 12 are now free to be rotated by the motor 29. Said motor will travel in rapid traverse up to the vicinity of the desired angular positon. At this stage the piston 30 is lowered towards the indexing plate 31 and the motor continues in slow traverse up to the indexing position when the piston 30 enters its groove in the indexing plate 31. This movement constitutes a signal for the valve controlling the oil to the hydraulic cylinder and piston unit 22. The piston 21 now starts its inward movement and the turrets 11 and 12 will be arrested.

The choice of the turret to be rotated is effected with the aid of the shift wheel 32 which either engages the wheel 33 upon rotation of the turret 11 or the wheel 34 for rotation of the turret 12.

During rotation of one turret the other turret is kept blocked against rotation in that the shifting fork which shifts the wheel 32 has teeth engaging in the wheel to be kept stationary.

In the embodiment illustrated the point of intersection 35 of the axes of the turrets 11 and 12 is situated in the plane in which the apices 36 of the tools 14 are contained. The point of intersection could also lie slightly laterally of said plane.

The invention is not restricted to the embodiment described above and illustrated in the drawing, but permits of being modified within the spirit and scope of the appended claims.

What I claim and desire to secure by Letters Patent is:

1. A turret toolpost for numerically controlled automatic lathes comprising first and second independently indexable disc turrets having cutting tools mounted therein, said cutting tools including external cutting tools and internal cutting tools, said first turret having said external cutting tools attached thereto, said second turret having a larger diameter than said first turret and having said internal cutting tools attached thereto as boring bars, axes of said first and second turrets making a small acute angle with one another.

2. A turret toolpost as claimed in claim 1, wherein said first turret is an inner turret mounted for rotation on a bearing sleeve making the small acute angle with a tubular sleeve fixedly connected with said bearing sleeve and mounted for rotation about the main axis of a turret housing, said axis also constituting the centre of rotation for said second turret which is an outer turret.

3. A turret toolpost as claimed in claim 2, wherein said outer turret is non-rotatably, but axially movably connected with said tubular sleeve connected with the bearing sleeve.

4. A turret toolpost as claimed in claim 2, wherein said tubular sleeve connected to said bearing sleeve is mounted on a bearing neck of said turret housing, a piston rod of a cylinder and piston unit extending through said bearing neck, and said piston rod cooperates with said bearing sleeve for shifting said sleeve by means of said cylinder and piston unit.

5. A turret toolpost as claimed in claim 4, wherein said piston rod is tubular and its axis is coazial with said tubular sleeve and inclined to said inner turret axis, a shaft for rotating said inner turret is rotatably supported within said tubular piston rod and drivingly connected to said inner turret with a universal type connecting means.

6. A turret toolpost as claimed in claim 1, wherein the point of intersection between said axes of said turrets is situated in a plane lying within the disc of said inner turret.

* * * * *